US005424929A

United States Patent [19]
Murray et al.

[11] Patent Number: 5,424,929
[45] Date of Patent: Jun. 13, 1995

[54] LIGHTING ASSEMBLY FOR USE IN CIGARET LIGHTER SHELL WITHOUT RELIANCE ON CONDUCTIVITY THEREOF

[75] Inventors: Donald W. Murray, Arlington, Tex.; Ronald J. Meister, Bradford, Pa.

[73] Assignee: Zippo Manufacturing Company, Bradford, Pa.

[21] Appl. No.: 222,269

[22] Filed: Apr. 4, 1994

Related U.S. Application Data

[63] Continuation-in-part of Ser. No. 998,057, Dec. 29, 1992, Pat. No. 5,359,505.

[51] Int. Cl.$^6$ .............................................. F21L 7/00
[52] U.S. Cl. .................................... 362/200; 362/109; 362/205; 362/207; 362/253
[58] Field of Search ............... 362/109, 186, 200, 201, 362/207, 208, 253, 204, 205, 155, 802

[56] References Cited

U.S. PATENT DOCUMENTS

| | | | |
|---|---|---|---|
| D. 175,315 | 8/1955 | Quandt | D26/38 X |
| D. 178,159 | 6/1956 | Szamborski | D26/38 X |
| D. 183,537 | 9/1958 | Okada | D26/38 X |
| 1,321,153 | 11/1919 | Runnion | 362/109 |
| 1,565,173 | 12/1925 | Lyeso | 362/109 |
| 1,784,114 | 12/1930 | Schulte | 362/201 |
| 1,940,843 | 12/1933 | Britsch | 362/201 |
| 1,948,613 | 2/1934 | Britsch | 362/201 |
| 1,951,097 | 3/1934 | Lyeso | 240/6.46 |
| 1,995,141 | 3/1935 | Barber et al. | 362/201 |
| 2,014,266 | 9/1935 | Sherbondy | 240/6.45 |
| 2,020,352 | 11/1935 | Bolduc | 362/205 |
| 2,032,695 | 3/1936 | Gimera et al. | D27/159 X |
| 2,066,028 | 12/1936 | Britsch | 240/6.4 |
| 2,075,883 | 4/1937 | Britsch | 240/10.6 |
| 2,118,997 | 5/1938 | Zook | 362/201 X |
| 2,249,692 | 7/1941 | Gelardin | 362/200 |
| 2,406,071 | 8/1946 | Galter | 431/143 X |
| 2,412,313 | 12/1946 | Battersby et al. | 362/201 |
| 2,494,886 | 1/1950 | Leif | D26/38 X |
| 2,607,883 | 8/1952 | Berkowitz | 240/6.46 |
| 2,697,297 | 12/1954 | Newberg | 362/201 X |
| 2,867,753 | 1/1959 | Quandt | 362/200 X |
| 3,010,645 | 11/1961 | Mandelstam | 230/249.5 |
| 3,247,688 | 4/1966 | Godbe | 431/143 X |
| 3,344,266 | 9/1967 | Bramson | 240/11 |
| 4,429,352 | 1/1984 | Griffin | 362/189 |
| 4,459,646 | 7/1984 | Drane | 362/200 X |
| 4,644,451 | 2/1987 | Chabria | 362/189 |
| 5,030,811 | 7/1991 | Von Gaisberg et al. | 219/268 |
| 5,359,505 | 10/1994 | Story et al. | 362/200 |

FOREIGN PATENT DOCUMENTS 1007563  5/1902  France.

Primary Examiner—Stephen F. Husar
Attorney, Agent, or Firm—Hodgson, Russ, Andrews, Woods & Goodyear

[57] ABSTRACT

A lighting assembly for use in a cigaret lighter shell. The lighting assembly comprises an insulative case for housing a power supply, such as batteries, and conductors for establishing an electrical circuit that includes the batteries, the conductors, and a light bulb and that does not rely on conductivity of the shell. An adjustable reflector and lens may be provided to focus and direct the beam generated by the bulb. One conductor is moved into contact with another of the conductors in response to opening of the lid of the shell to close the electrical circuit to turn the flashlight on. One of the conductors is moved out of contact with another in response to closing of the lid to turn the flashlight off. One of the conductors is positioned for preventing its contact with another conductor when the lighting assembly is removed from the shell so that it is turned off. One conductor may be manually positioned or locked in position so that it is not in contact with another conductor so that the flashlight is turned off while the lid is open.

13 Claims, 3 Drawing Sheets

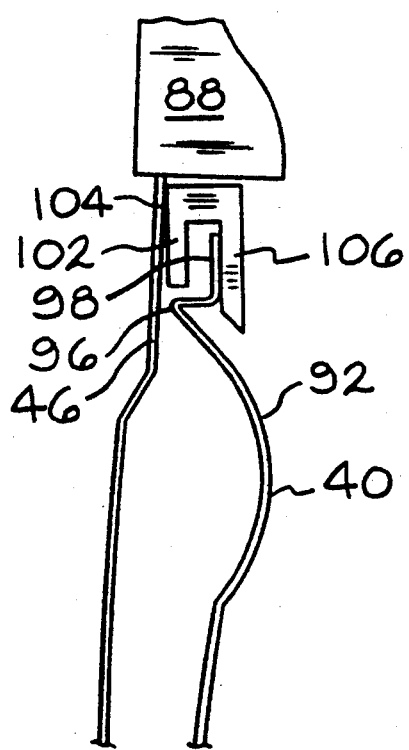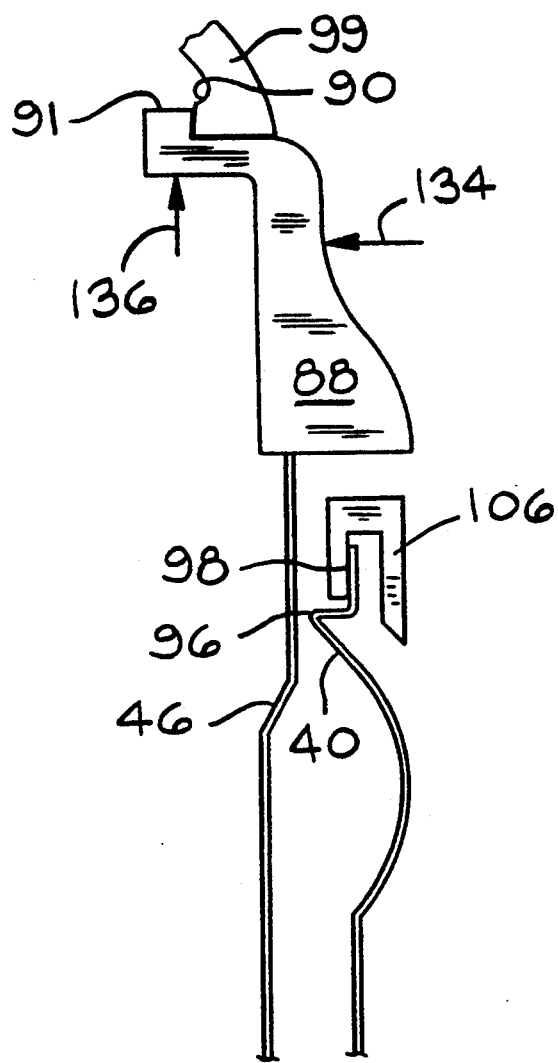
FIG. 4
FIG. 5

LIGHTING ASSEMBLY FOR USE IN CIGARET LIGHTER SHELL WITHOUT RELIANCE ON CONDUCTIVITY THEREOF

This is a continuation-in-part of U.S. patent application Ser. No. 07/998,057, filed Dec. 29, 1992, now U.S. Pat. No. 5,359,505, which is assigned to the assignee of the present invention and which is incorporated herein by reference.

The present invention relates generally to lamps or flashlights. More particularly, the present invention relates to a flashlight or other lighting assembly adapted for insertion into a cigaret lighter shell.

Lamps and flashlights of different shapes and sizes and utilizing different on/off switches are well known. Miniature flashlights come in many sizes and shapes. However, these flashlights are often too large or bulky or have shapes which are inconvenient for carrying. The outer casings or shells for these miniature flashlights are often complex from a manufacturing standpoint, which adds to the cost of the flashlights. Finally, these miniature flashlights are typically not well suited for the rugged storage and carrying conditions to which they are often subjected.

The parent application discloses a lighting assembly adapted for insertion into a cigaret lighter shell. The lighting assembly includes an insulative case for housing a power supply, such as batteries, and conductors for establishing an electrical circuit that includes the batteries, the conductors, a light bulb, and the cigaret lighter shell. A resilient portion of one conductor is biased against a wall of the cigaret lighter shell to close the electrical circuit and place the flashlight in an on position. An insulative tip is provided on an end of the conductor and may be manually manipulated to remove the conductor from contact with the shell wall to open the electrical circuit and place the flashlight in an unlocked off position. A groove may also be provided in the insulative case to receive the tip and hold the conductor in a locked off position. When a lid of the cigaret lighter shell is closed, the lid engages the tip to remove the conductor from contact with the shell wall and turn the flashlight off.

Such a flashlight relies on the conductivity of the shell. This not only requires that the shell be composed of a conductive material but also subjects the flashlight to possible inoperativeness by way of the shell becoming non-conductive. For example, a powder coating applied to the shell exterior could inadvertently partially coat the shell interior so as to prevent completion of the circuit.

It is accordingly an object of the present invention to provide a flashlight or other lighting assembly adapted for insertion into a cigaret lighter shell and which does not rely on conductivity of the shell.

It is a further object of the present invention to provide such a flashlight adapted for insertion into a shell composed of either conductive or non-conductive material.

It is yet another object of the present invention to provide such a flashlight which may utilize a cigaret lighter shell as an outer casing or shell.

It is a still further object of the present invention to provide such a flashlight which is reliable and well suited for rugged storage and carrying conditions.

It is another object of the present invention to cause such a flashlight to be turned on and off by opening and closing the lid of the cigaret lighter shell.

It is a still further object of the present invention to provide such a flashlight adapted for insertion into a cigaret lighter shell which may be placed in a locked off position so that the light will stay off even when the lid of the cigaret lighter shell is open.

It is yet another object of the present invention to cause such a flashlight to turn off upon its removal from the shell.

It is a further object of the present invention to provide an adjustable reflector for such a flashlight.

In accordance with the present invention, a flashlight or other lighting assembly adapted for insertion into a shell has means responsive to opening of the shell lid for moving an end portion of one conductor into contact with an end portion of another conductor for completion of an electrical circuit for turning the flashlight on whereby the shell is not used to complete the circuit and it is therefore unnecessary that the shell be conductive.

The above and other objects, features, and advantages of the present invention will be apparent in the following detailed description of the preferred embodiment of the present invention when taken in conjunction with the accompanying drawings wherein the same reference numerals depict the same or similar parts throughout the several views.

BRIEF DESCRIPTION OF THE DRAWINGS

FIG. 4 is a partial view thereof illustrating the turning off of the flashlight upon its removal from the shell.

FIG. 5 is a partial view thereof illustrating the flashlight in a locked off position.

DETAILED DESCRIPTION OF THE PREFERRED EMBODIMENT

Figure 1:
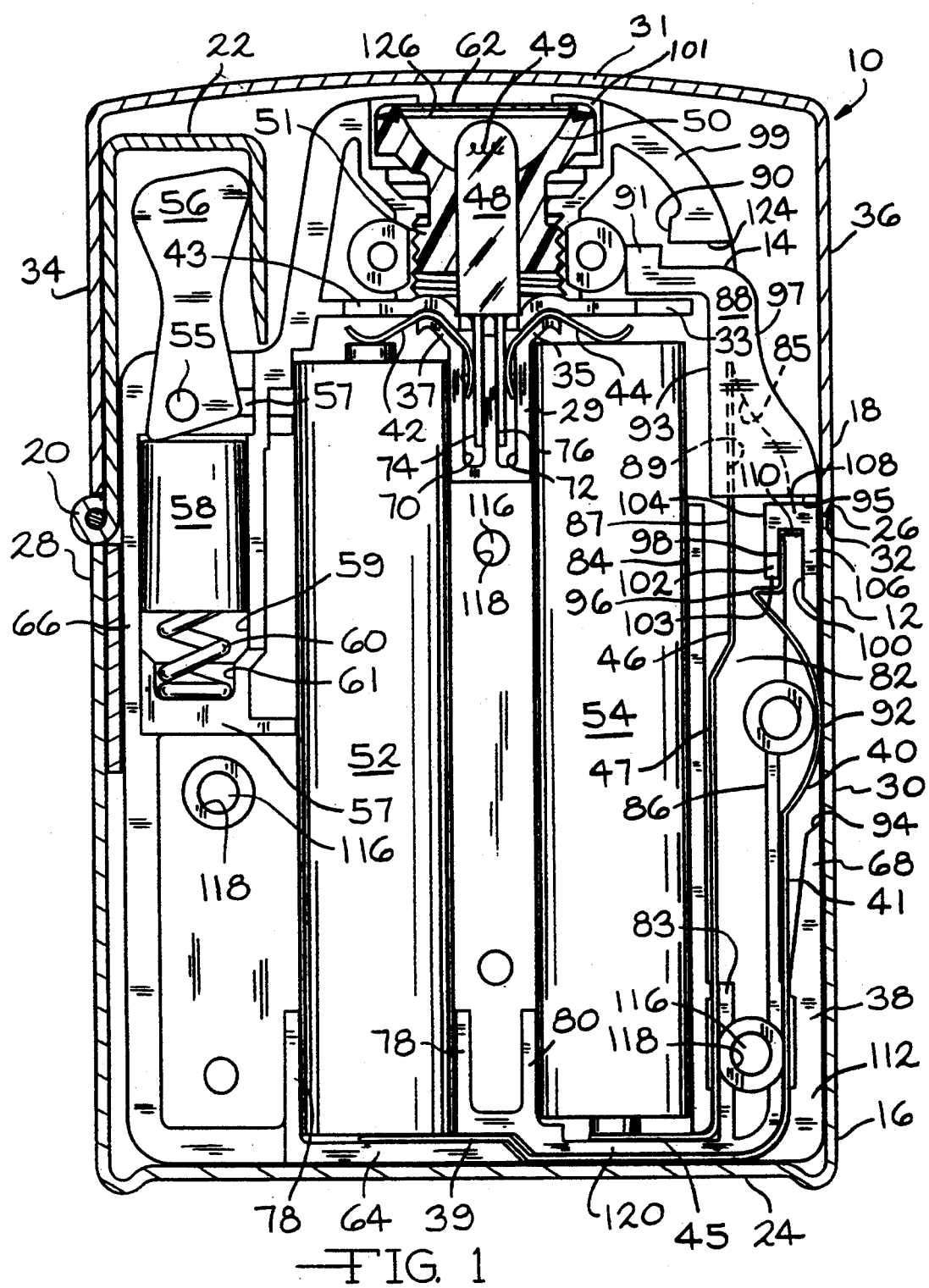
FIG. 1 is a left side elevation view of a flashlight which embodies the present invention, the left housing removed in order to show the internal parts, and the flashlight inserted in a cigaret lighter shell which is shown in cross-section.
Figure 2:
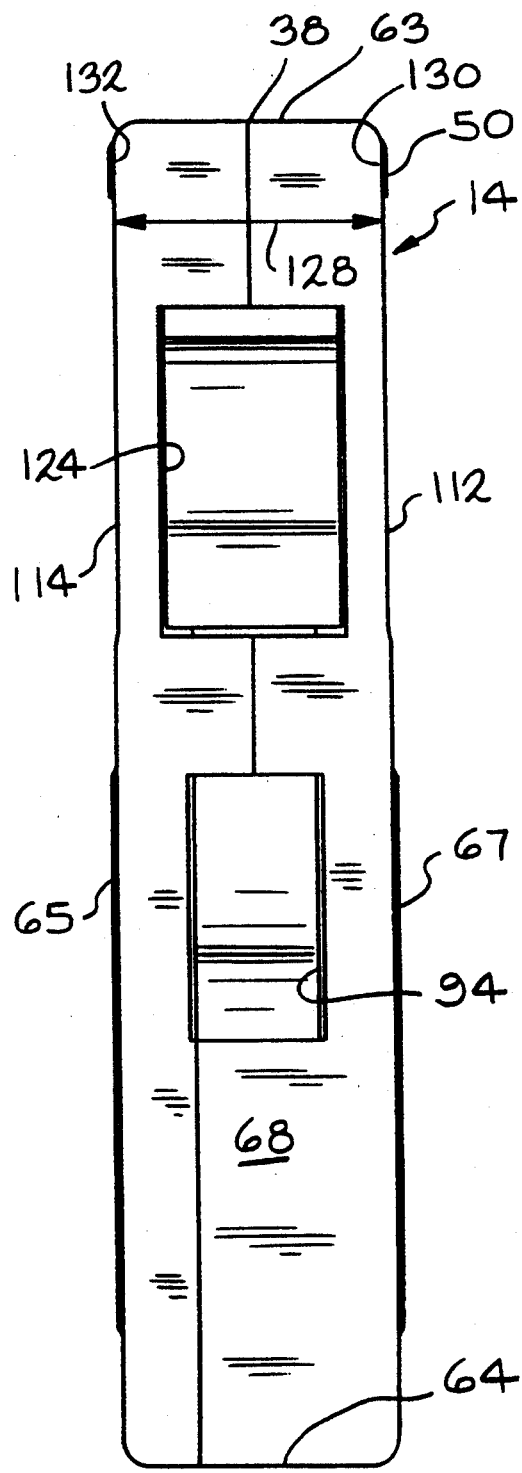
FIG. 2 is a front elevation view thereof showing both the left and right housings and with the cigaret lighter shell not shown.

Referring to FIGS. 1 and 2, there is illustrated generally at 10 a lamp or flashlight which is comprised of a cigaret lighter shell 12 and a lighting assembly 14.

The shell 12 has a base 16 and a lid 18 connected by a hinge 20. A bracket 22 is secured to an inner wall of the lid 18 for reasons to be described. The base 16 has a floor 24, a lip 26, a rear wall 28, a front wall 30, and two side walls (not shown). The lid 18 has a roof 31, a lip 32, a rear wall 34, a front wall 36, and two side walls (not shown).

The lighting assembly 14 is adapted to be inserted into the shell 12 and comprises an insulative case 38 and conductors 40, 42, 44 and 46. As viewed in FIG. 2, the case 38 includes a right housing 112 in which the various components are assembled and a left housing 114. The housings 112 and 114 are connected by a plurality of alignment pins 116 which are tapered to be press fit in apertures 118 in the housings 112 and 114. If needed or desired, glue may be applied to the pins 116 or the pins may be ultrasonically welded in the housing apertures to insure a secure connection. Only the right housing 112 is shown in FIG. 1, the lighting assembly 14 shown with the left housing removed to show the various internal components. Various internal walls are provided for mounting the various components, these walls being described to the extent necessary to describe the present invention. The placement of such internal walls can be determined using principles commonly known to those of ordinary skill in the art to which this invention pertains.

A light bulb 48, a reflector 50, a power supply, i.e., batteries 52 and 54, a lever 56, a plunger 58, and a spring 60 may also be supplied. The lighting assembly 14 may also be provided with a lens 62.

The case 38 has a bottom wall 64, a rear wall 66, a front wall 68, an upper wall 63, and left and right side walls 65 and 67 respectively. An upper portion of the case 38 is constructed to have apertures 70 and 72 for receiving and retaining electrodes 74 and 76 respectively of the light bulb 48. Internal wall structure 101 is provided to secure the reflector 50 and lens 62 in place for focusing and directing a beam of light generated by the bulb 48. The plunger 58 and spring 60 are secured within an opening 59 in the case 38 defined by internal case walls 57 near the rear wall 66 of the case 38 and, in combination with the lever 56, which is suitably pivotly attached as at 55, function to retain the lid 18 in the closed position. The cam spring plunger 58 is suitably hollow with a counterbore (not shown) for the upper end portion of the spring 60. The diameter of the bottom portion of the opening 59 is decreased to provide a bore 61 in the case 38 for accommodating the lower portion of the spring 60, the diameter of the bore 61 being substantially equal to the diameter of the counterbore in the plunger 58. The lever 56, plunger 58, and spring 60 combination are well known to those of ordinary skill in the art and will therefore not be discussed in greater detail.

The bottom of the case 38 has a pair of spaced short internal vertically-extending wall portions 78 for receiving and retaining the bottom portion of battery 52, the upper portion thereof being retained by wall structures 29 and 57. A short internal vertically-extending wall portion 80 and a relatively long internal vertically-extending wall portion 84 are spaced apart for receiving and retaining the bottom portion of the battery 54, the upper portion thereof being retained by wall structure 29 in combination with wall portion 84. Closely adjacent wall 84 is a short internal vertically-extending wall portion 83, and a relatively long internal vertically-extending wall 86 is intermediate wall 83 and front wall 68. An internal horizontally-extending wall portion 120 connects the bottoms of walls 78, 80, 83 and 86. The bottom of wall portion 78 connects to case bottom wall 64.

A first end portion 39 of second conductor 40 is disposed to lie alongside the outside of the case 38 along the outer surface of wall portion 120 and extends between wall portion 120 and a portion of the bottom wall 64 and is held pinchingly thereby and terminates at an end which is pinched between the lower electrode of battery 52 and the bottom wall 64 to be in electrical contact with the lower electrode of the battery 52. A second end portion 41 of the second conductor 40 extends upwardly adjacent the front side wall 68 of the case 38 and alongside the outer surface of internal wall 86 and is pinched therebetween over a short distance from wall 120 after which the inner surface of front side wall 68 flares outwardly to form opening 94.

Conductor 42, disposed within an upper portion of the case 38, electrically contacts the upper electrode of the battery 52 and is pinchingly held between internal wall portion 43 and an outwardly flared portion 37 of the wall structure 29 defining apertures 70 and 72.

Conductor 42 extends between portions 37 and 43 and into the aperture 70 and electrically contacts the electrode 74 of the bulb 48. The electrode 74 is connected to the filament, illustrated at 49, of the bulb 48 which is in turn connected to the other electrode 76 of the bulb 48. A portion of the conductor 44 extends into the aperture 72 for electrically contacting the electrode 76 of the bulb 48. Another portion of the conductor 44 extends between outwardly flared portion 35 of wall structure 29 and an internal wall portion 33 and into a space between wall portion 33 and battery 54 to electrically contact the upper electrode of the battery 54.

A first portion 45 of first conductor 46 is disposed in the case 38 near the bottom wall 64 and extends into electrical contact with the bottom electrode of the battery 54, conductor portion 45 being pinched between the battery electrode and wall portion 120. A channel 82 is defined by internal wall 84 on the inner side and by internal wall 86 and wall structure 102 on the outer side. Conductor 46 is held or pinched between internal walls 83 and 84 and extends therefrom into the channel 82. A resilient second portion 47 of the first conductor 46 extends within the channel 82 over the length of the channel 82 alongside the internal wall 84 for a majority of the length of channel 82 then is formed to extend outwardly from the inner wall 84 so that an upper portion 87 extends upwardly therefrom and is disposed intermediate the sides of the channel. An insulative tip or switch button 88 is secured to the end of the conductor 46. The tip 88 has a vertical slot 89 in which conductor portion 87 is snugly but slidingly received so that tip 88, floatingly positioned, may be moved vertically relative to conductor portion 87. A pair of recesses 85 extend outwardly from slot 89 to provide easier moldability. For reasons to be described, an upper portion or lip 91 of the tip 88 is sized to be receivable within an opening 90 in the case 38 defined by an internal wall 99 by manually pushing the tip 88 inwardly and upwardly. The tip 88 has an inner vertical surface 93, a lower surface 95 in which conductor portion 87 is received near the inner vertical surface 93, and a surface 97 which extends upwardly from the outer end of surface 95 and which is angled inwardly or away from the front wall 68 of the case 38 as well as the front wall 36 of the lid 18 of the shell 12 when the lid is closed. The tip 88 is further constructed so that the lip 91 is offset inwardly of surface 93.

A medial part of the second portion 41 of the second conductor 40 is bent to form a protrusion 92 which extends toward the front wall 68 of the case 38 and the front wall 30 of the base 16 of the shell 12. The opening 94 in the front wall 68 of the case 38 (formed by a cutout in the right housing 112) permits the protruding portion 92 of the conductor 46 to contact the front wall 30 of the base 16 of the shell 12 as well as to extend outwardly of the front wall 68 when the case 38 is removed from the shell 12. Although the protrusion 92 depicted is generally semi-spherical, the protrusion 92 may take any number of shapes or may be formed by a knob or other protuberance extending outwardly from the conductor 40.

The upper part of protrusion 92 extends inwardly toward first conductor 46 and ends in the formation of a hair-pin shaped projecting portion 96 from which the second conductor 40 extends outwardly away from first conductor 46 then is bent to provide a tip portion 98 which extends vertically to an end. The tip 98 is disposed to be received in a vertical slot, illustrated at 100, formed in the wall structure 102, which slot is defined by an inner wall 103 having an inner surface 104, an outer wall 106 the outer surface of which is the surface of the front wall 68 of the case 38, and an upper wall 108. The tip 98 is movable inwardly and outwardly over the width, illustrated at 110, of the slot 100, and the projection 96 will accordingly move inwardly and outwardly by the same distance that tip 98 moves. The wall structure 102 thus acts as a detent means for the tip 98.

Figure 3:
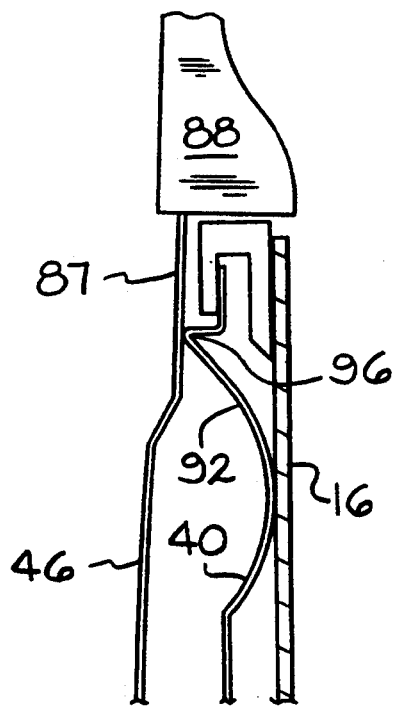
FIG. 3 is a partial view thereof illustrating the closing of the circuit for turning on the flashlight when the lid for the cigaret lighter shell is opened.

An opening, illustrated at 124, in communication with opening 90, is formed in the case housings 112 and 114 to allow movement outwardly of tip 88. The conductors 40, 42, 44, and 46 are composed of flat spring stock which may be perhaps about 0.03 inch thick and perhaps about 0.2 inch wide or other suitable material. The conductor 46 is formed and disposed so that it seeks an outward position, as illustrated in FIG. 3, and is biased to the inward position, shown in FIG. 1, by the lid 18 of the shell 12. The conductor 40 is formed and disposed to seek an outward position of its tip 98 against outer wall 106, as illustrated in FIG. 4, and is biased to the inner position against inner wall 102, as shown in FIG. 1, by the base 16 of the shell 12.

The reflector 50 has a threaded base portion or housing 51 for threadedly securing reflector 50 to internal wall structure 99 so as to provide an adjustable beam or reflector, i.e., the position of the reflector 50 relative to the filament 49 is adjustable for providing a desired focus. The diameter, illustrated at 126, of the reflector 50 is slightly greater than the case width, illustrated at 128, but less than the inner width of the shell 12 so as to not interfere with closing of the lid 18 but so as to allow the reflector 50 to protrude slightly through openings, illustrated at 130 and 132, in the housings 112 and 114 respectively for manipulation for such adjustment, as illustrated in FIG. 2.

The present invention allows the shell 12 to be either conductive or non-conductive. If it is non-conductive, the conductor 40 will serve to complete the circuit. If the shell is conductive, conductor 40 and the conductive shell will act as parallel and redundant elements in the conductive path.

Before the lighting assembly 14 is inserted into the shell 12 for operation, the conductor 40 is in an outward position, as illustrated in FIG. 4, so that the protrusion 92 thereof extends through opening to an extent that the tip 98 engages the outer wall portion 106 with a result that the projecting portion 96 is positioned outwardly of the inner surface 104 of the inner wall portion 102 so that second conductor 40 cannot be contacted by first conductor 46 since the outward movement of the first conductor 46 is limited or stopped by the wall portion 102. Thus, the lighting assembly 14 is rendered non-operational as normally used when removed from the shell.

In operation, the lighting assembly 14 is inserted into the base 16 of the shell 12. This causes the protrusion 92 of second conductor 40 to be pushed inwardly through opening 94 by the shell base 16 so that the tip 98 is biased to lie alongside or engage the inner wall portion 102, as illustrated in FIG. 3, so that the projection 96 is in position inwardly of the inner wall portion 102 to be contacted by conductor 46 for closing the circuit.

When the lid 18 is in the open position, as illustrated in FIG. 3, tip 88 extends through the opening 124 in the front wall 68 of the case 38 and brings first conductor 46 outwardly to contact the projection 96 of second conductor 40 so that an electrical current may pass from the conductor 46 to the conductor 40 to complete an electrical circuit which includes the batteries 52 and 54, the bulb 48, and the conductors 40, 42, 44, and 46, thereby placing the flashlight in an on position.

When the lid 18 is being moved to the closed position, as illustrated in FIG. 1, the lid 18 contacts the angled top surface 97 of the tip 88, and the lip 32 of the lid 18 pushes or biases the tip 88 inwardly of the case 38 thereby effecting movement of conductor 46 inwardly and out of contact with conductor 40 to open the electrical circuit and place the flashlight in an unlocked off position.

When the lid 18 is in the open position, the floating tip 88 may be manually pushed inwardly of the case 38, as illustrated at 134 in FIG. 5, so that the first conductor 46 is removed from contact with the second conductor 40 to open the electrical circuit and place the flashlight in an unlocked off position.

Once in the unlocked off position, the tip 88 may also be manually pushed upwardly, as illustrated at 136 in FIG. 5, so that the upper portion or lip 91 of the tip 88 slides into and nests within the opening 90 to place the flashlight in a locked off position. In the locked off position, the electrical circuit will remain open regardless of whether the lid 18 is in the open or closed position.

Several advantages result from the foregoing combination. For example, the present invention discloses a lighting assembly 14 which may be inserted into a cigaret lighter shell 12. The flashlight 10 has a size and shape which is convenient to carry and use, and the cigaret lighter shell 12 makes the flashlight 10 well suited for rugged storage and carrying conditions. The manually operable tip 88 permits the flashlight to be turned on or off even when the lid 18 is open, and the locked off position permits the flashlight to remain off even when the lid 18 is open. These advantages may be achieved, in accordance with the present invention, without the necessity of using the shell to complete the electrical circuit. This eliminates the possibility that the flashlight may become inoperative due to the shell becoming non-conductive by, for example, a powder coating becoming inadvertently applied to a portion of the interior surface of the shell. This also desirably allows the shell to be composed of a non-conductive as well as conductive material.

It is understood that variations may be made in the present flashlight without departing from the scope of the present invention, as defined in the appended claims. For example, the reflector 50 and lens 62 may be omitted or may be removable so that the bulb 48 provides an unfocused, substantially spherical source of light. The lighting assembly of the present invention may also be utilized with shells, composed of either conductive or non-conductive material, other than cigaret lighter shells. Further, the flashlight may use one, two, or more batteries depending upon the size and shape of the container or shell utilized. Further still, bulbs other than the bi-pin bulb 48 depicted may be used.

A latitude of modification, change, and substitution is intended in the foregoing disclosure, and, in some instances, some features of the invention may be employed without a corresponding use of other features.

What is claimed is:

1. A lighting assembly comprising: a case adapted for insertion into a shell which includes a lid movable between open and closed positions, said case including means for retaining a power supply; a light bulb secured to said case; a resilient first conductor having a first end portion disposed for establishing an electrical contact with the power Supply and having a second end portion; means comprising a second conductor having a first end portion disposed for establishing an electrical contact with the power supply and having a second end portion for completing an electrical circuit to permit electricity to pass from said power supply through said light bulb and said conductors, said second conductor disposed to be within the shell when said case is inserted into the shell; and means responsive to opening of the lid for moving said second end portion of said first conductor from a first position in which said first conductor is removed from contact with said second conductor to a second position in which said second end portion of said first conductor is in contact with said second end portion of said second conductor.

2. A lighting assembly according to claim 1 further comprising
a shell into which said case is insertable, said shell including
a lid movable between open and closed positions.

3. A lighting assembly according to claim 2 wherein said shell is a cigaret lighter shell.

4. A lighting assembly according to claim 1 wherein said second conductor is composed of a resilient material, said second end portion of said second conductor disposable in a first position when said case is inserted into the shell so as to be contactable by said second end portion of said first conductor, said second end portion of said second conductor being adapted for movement to a second position so as not to be contactable by said second end portion of said first conductor when said case is removed from the shell.

5. A lighting assembly according to claim 4 wherein said second end portion of said second conductor has a tip, the lighting assembly further comprising a detent means for receiving said tip for allowing movement thereof between said first and second positions, said second end portion of said second conductor further having a section which is adapted to project beyond said detent means to be contactable by said second end portion of said first conductor when said second end portion of said second conductor is in said first position and to be disposed so that said detent means blocks said second end portion of said second conductor from being contactable by said second end portion of said first conductor when said second end portion of said second conductor is in said second position.

6. A lighting assembly according to claim 1 wherein said means for moving said second end portion of said first conductor comprises a member attached to said second end portion of said first conductor and movable inwardly and outwardly of the case in response to closing and opening of the lid respectively.

7. A lighting assembly according to claim 6 further comprising
means defining a slot in said member sized for receiving said second end portion of said first conductor for sliding movement therein and means for locking said member in a position such that said second end portion of said first conductor is in said first position when the lid is opened, said member being slidable along said second end portion of said first conductor for movement to said locked position.

8. A lighting assembly according to claim 1 further comprising
means defining an adjustable reflector.

9. A lighting assembly according to claim 8 wherein said adjustable reflector means comprises a reflector and a reflector housing threadedly engaged to the lighting assembly whereby the reflector may be raised and lowered relative to a filament of the light bulb.

10. A lighting assembly according to claim 9 further comprising
at least one opening means in said case for receiving said reflector means so that said reflector means may be manually rotatably adjusted.

11. A lighting assembly according to claim 1 wherein said conductors are composed of flat spring stock.

12. A lighting assembly according to claim 1 wherein said power supply comprises at least one battery.

13. A lighting assembly according to claim 1 wherein said power supply comprises two batteries.

* * * * *